US011843204B2

(12) United States Patent
Xie et al.

(10) Patent No.: US 11,843,204 B2
(45) Date of Patent: Dec. 12, 2023

(54) SIGNAL PROCESSING CIRCUIT, CONTACTLESS CONNECTOR, SIGNAL PROCESSING METHOD AND STORAGE MEDIUM

(71) Applicant: Institute of Geology and Geophysics, Chinese Academy of Sciences, Beijing (CN)

(72) Inventors: Qijun Xie, Beijing (CN); Yongyou Yang, Beijing (CN); Qingbo Liu, Beijing (CN); Qingyun Di, Beijing (CN); Linfeng Hong, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 31 days.

(21) Appl. No.: 17/257,485

(22) PCT Filed: May 28, 2020

(86) PCT No.: PCT/CN2020/092886
§ 371 (c)(1),
(2) Date: Dec. 31, 2020

(87) PCT Pub. No.: WO2021/208204
PCT Pub. Date: Oct. 21, 2021

(65) Prior Publication Data
US 2023/0025017 A1    Jan. 26, 2023

(30) Foreign Application Priority Data

Apr. 17, 2020 (CN) .......................... 202010306316.9

(51) Int. Cl.
*G06F 13/40* (2006.01)
*G06F 13/42* (2006.01)
(Continued)

(52) U.S. Cl.
CPC ..... *H01R 13/6691* (2013.01); *G06F 13/4068* (2013.01); *G06F 13/4213* (2013.01);
(Continued)

(58) Field of Classification Search
CPC . H01R 13/6691; H01R 24/40; G06F 13/4068; G06F 13/4213; G06F 13/4282; H04L 69/08; H04B 3/02
See application file for complete search history.

(56) References Cited

U.S. PATENT DOCUMENTS 9,089,255 B2 * 7/2015 Kato .................. A61B 1/00114
9,707,807 B2 * 7/2017 Summers ................ H01F 27/02
(Continued)

FOREIGN PATENT DOCUMENTS

CN      101227032 A    7/2008
CN      102197448 A    9/2011
(Continued)

OTHER PUBLICATIONS

Chinese Office Action Application No. 202010306316.9; dated Oct. 30, 2020; pp. 11.
(Continued)

*Primary Examiner* — Henry Tsai
*Assistant Examiner* — Harry Z Wang
(74) *Attorney, Agent, or Firm* — CANTOR COLBURN LLP

(57) ABSTRACT

Disclosed is a signal processing circuit, a contactless connector, a signal processing method and a storage medium. One end of a cable of the signal processing circuit can be connected to a device and the other end of the cable of the signal processing circuit is connected to a port processing unit for receiving a signal transmitted by the device and/or transmitting a signal to the device; one end of the port processing unit is connected to the cable, and the other end
(Continued)

of the port processing unit is connected to a signal processing unit for acquiring a data communication transmission mode of a port of the device connected to a connector, and performing interface configuration on the cable according to the data communication transmission mode; and the signal processing unit is connected to the main coil or the secondary coil, and is configured to, if receiving the signal transmitted by the device, transmit the signal to the main coil and/or the secondary coil, and/or is configured to, if receiving the signal transmitted by the main coil and/or the secondary coil, transmit the signal to the device according to the data communication transmission mode. According to the present application, the contactless connector adapts to different transmission protocols of the device port while remote wireless signal transmission is realized.

16 Claims, 8 Drawing Sheets

(51) Int. Cl.
  *H04L 69/08* (2022.01)
  *H01R 13/66* (2006.01)
  *H01R 24/40* (2011.01)
  *H04B 3/02* (2006.01)
(52) U.S. Cl.
  CPC ......... *G06F 13/4282* (2013.01); *H01R 24/40* (2013.01); *H04L 69/08* (2013.01); *H04B 3/02* (2013.01)

(56) References Cited

U.S. PATENT DOCUMENTS

| | | | |
|---|---|---|---|
| 2006/0254911 A1* | 11/2006 | Lindmueller | H01F 38/14 204/424 |
| 2014/0152420 A1* | 6/2014 | Wolski | G07C 9/00182 70/283.1 |
| 2014/0252876 A1* | 9/2014 | Riezebos | H04B 5/0031 307/104 |
| 2016/0006485 A1* | 1/2016 | Habraken | H04B 5/0093 333/24 C |

FOREIGN PATENT DOCUMENTS

| | | |
|---|---|---|
| CN | 105655838 A | 6/2016 |
| CN | 107069989 A | 8/2017 |
| CN | 107924377 A | 4/2018 |
| CN | 110311267 A | 1/2019 |
| CN | 109884403 A | 6/2019 |
| CN | 110086506 A | 8/2019 |
| CN | 111479175 A | 7/2020 |
| JP | 0714730 A | 1/1995 |

OTHER PUBLICATIONS

Chinese Notice of Allowance Application No. 202010306316.9; dated Dec. 8, 2020; pp. 4.

* cited by examiner

SIGNAL PROCESSING CIRCUIT, CONTACTLESS CONNECTOR, SIGNAL PROCESSING METHOD AND STORAGE MEDIUM

CROSS-REFERENCE TO RELATED APPLICATION

This application is a National Phase of PCT Application No. PCT/CN2020/092886 filed May 28, 2020 which claims priority to Chinese Application No. 202010306316.9 filed on Apr. 17, 2020, entitled "SIGNAL PROCESSING CIRCUIT, CONTACTLESS CONNECTOR, SIGNAL PROCESSING METHOD AND STORAGE MEDIUM", which is incorporated herein by reference in its entirety

TECHNICAL FIELD

The present invention belongs to the technical field of connectors and particularly relates to a signal processing circuit, a contactless connector, a signal processing method and a storage medium.

BACKGROUND

With the development of the communication technology, the wired communication technology has been widely applied to various electronic products and apparatuses. In some special environments, requirements for the airtightness and the service life of the connector for communication between devices are very high.

For example, when the wired connector is used in water environments such as oceans, lakes and the like or sand and dust environments such as deserts, wild places and the like, the requirement for the sealing property of the connector is very high; meanwhile, it is necessary to prevent water and dust in the plugging and unplugging process of the connector, and the stress in the physical plugging and unplugging process will reduce the service life of the connector. If optical signals, microwave signals or acoustic signals are used for communication, in some mediums such as seawater, electromagnetic wave and radio frequency attenuate seriously, the communication distance is limited and the acoustic wave communication speed is limited; meanwhile the communication is greatly affected by the underwater acoustic channel, such as the common multipath effect, Doppler effect and the like. Furthermore, the existing connector using the wireless transmission technology generally can only be configured as one protocol, that is, a protocol as same as the port of the connected device, otherwise, data cannot be transmitted.

SUMMARY

In view of the above disadvantages, the present invention provides a signal processing circuit, a contactless connector, a signal processing method and a storage medium. According to the signal processing circuit of the present application, the contactless connector adapts to different transmission protocols of the device port while remote wireless signal transmission is realized.

The present invention is implemented by the following technical solutions:

According to a first aspect, the embodiment of the present invention provides a signal processing circuit, which is applied to a contactless connector. The contactless connector includes a plug and a socket; the plug includes a main coil; the socket includes a secondary coil; and the plug and the socket are in communication connection respectively through electromagnetic coupling between the main coil and the secondary coil. The signal processing circuit includes a cable, a port processing unit and a signal processing unit; the cable, one end of which can be connected to a device and the other end of which is connected to the port processing unit, is configured to receive a signal transmitted by the device and/or transmit a signal to the device; the port processing unit, one end of which is connected to the cable and the other end of which is connected to the signal processing unit, is configured to acquire a data communication transmission mode of a port of the device connected to the connector and perform interface configuration on the cable according to the data communication transmission mode; and the signal processing unit, which is connected to the main coil or the secondary coil, is configured to, if receiving the signal transmitted by the device, transmit the signal to the main coil and/or the secondary coil; and/or is configured to, if receiving the signal transmitted by the main coil and/or the secondary coil, transmit the signal to the device according to the data communication transmission mode.

In a preferred implementation manner, the port processing unit includes a signal processing module. The signal processing module is configured to: calculate a device side signal compensation factor according to the received signal and an initial signal transmitted by the device; receive the signal transmitted by the main coil and/or the secondary coil and convert the signal according to the data communication transmission mode; and perform compensation processing on the converted signal according to the device side signal compensation factor, and transmit the processed signal to the device.

In a preferred implementation manner, the signal processing unit includes a carrier compensation module; one end of the carrier compensation module is connected to the port processing unit and the other end of the carrier compensation module is connected to the main coil and/or the secondary coil; the carrier compensation module is configured to calculate a main coil side signal compensation factor according to the acquired signal transmitted by the main coil and a first preset signal, perform compensation processing on the signal transmitted by the device according to the main coil side signal compensation factor, and transmit the processed signal to the main coil; and/or the carrier compensation module is further configured to calculate a secondary coil side signal compensation factor according to the acquired signal transmitted by the secondary coil and a second preset signal, perform compensation processing on the signal transmitted by the device according to the secondary coil side signal compensation factor, and transmit the processed signal to the secondary coil.

In a preferred implementation manner, the plug and/or the socket further includes a command processing unit; the command processing unit is connected to the signal processing unit; the command processing unit is configured to determine whether there is a space capable of storing a signal in the socket, and if not, to control the plug to stop transmitting the signal to the socket; and/or the command processing unit is configured to determine whether there is a space capable of storing a signal in the plug, and if not, to control the socket to stop transmitting the signal to the plug.

In a preferred implementation manner, the command processing unit is further configured to: determine whether a signal in the plug is transmitted to the socket, and if not, to transmit first prompt information representing that there is no signal to be transmitted; and/or determine whether a signal in the socket is transmitted to the plug, and if not, to transmit second prompt information representing that there is no signal to be transmitted.

According to a second aspect, the embodiment of the present invention provides a contactless connector. The contactless connector includes a plug and a socket. The plug includes: a first magnetic core; a first threaded shell, configured to wrap a periphery of the first magnetic core, an inner wall of the first threaded shell and the periphery of the first magnetic core forming a toothed cabin; a first coil, arranged on the toothed cabin of the first threaded shell, the first coil and the first magnetic core forming a main coil. The socket includes: a second magnetic core; a second threaded shell, arranged at an inner periphery of the second magnetic core, an inner wall of the second threaded shell and the inner periphery of the second magnetic core forming a toothed cabin, and the plug and the socket are in threaded connection through the first threaded shell and the second threaded shell; a second coil, arranged on the toothed cabin of the second threaded shell, the second coil and the second magnetic core forming a secondary coil, and the main coil and the secondary coil are electromagnetically coupled to realize communication connection between the plug and the socket when the plug is connected to the socket. The contactless connector further includes the signal processing circuit according to the first aspect or any implementation manner of the first aspect.

According to a third aspect, the embodiment of the invention provides a signal processing method, applied to the contactless connector in the second aspect. The signal processing method includes: acquiring a data communication transmission mode of a port of a device connected to the contactless connector; performing interface configuration on the contactless connector according to the data communication transmission mode; if receiving the signal transmitted by the device, transmitting the signal to the main coil and/or the secondary coil; and/or if receiving the signal transmitted by the main coil and/or the secondary coil, transmitting the signal to the device according to the data communication transmission mode.

In a preferred implementation manner, the method further includes: calculating a device side signal compensation factor according to the received signal and an initial signal transmitted by the device; and the receiving the signal transmitted by the main coil and/or the secondary coil and transmitting the signal to the device according to the data communication transmission mode includes: receiving the signal transmitted by the main coil and/or the secondary coil and converting the signal according to the data communication transmission mode; and performing compensation processing on the converted signal according to the device side signal compensation factor and transmitting the processed signal to the device.

In a preferred implementation manner, the method further includes: calculating a main coil side signal compensation factor according to the acquired signal transmitted by the main coil and a first preset signal; and the receiving the signal transmitted by the device and transmitting the signal to the main coil specifically includes: performing compensation processing on the signal transmitted by the device according to the main coil side signal compensation factor and transmitting the processed signal to the main coil.

In a preferred implementation manner, the method further includes: calculating a secondary coil side signal compensation factor according to the acquired signal transmitted by the secondary coil and a second preset signal; and the receiving the signal transmitted by the device and transmitting the signal to the secondary coil specifically includes: performing compensation processing on the signal transmitted by the device according to the secondary coil side signal compensation factor and transmitting the processed signal to the secondary coil.

In a preferred implementation manner, the method further includes: determining whether there is a storage space capable of storing a signal in the socket of the contactless connector, and if not, controlling the plug to stop transmitting the signal to the socket; and/or, determining whether there is a storage space capable of storing a signal in the plug of the contactless connector, and if not, controlling the socket to stop transmitting the signal to the plug.

In a preferred implementation manner, the method further includes: determining whether a signal in the plug of the contactless connector is transmitted to the socket, and if not, transmitting first prompt information representing that there is no signal to be transmitted; and/or determining signal in the socket of the contactless connector is transmitted to the plug, and if not, transmitting second prompt information representing that there is no signal to be transmitted.

According to a fourth aspect, the embodiment of the present invention provides a computer readable storage medium, storing a computer program, wherein the program, when being executed by a processor, enables the processor to perform the signal processing method according to the third aspect or any one of implementation manners of the third aspect.

The technical solutions of the present application can bring the following beneficial effects:

1. according to the signal processing circuit of the present application, the plug and/or the socket can configure a protocol adapted to the port of the device according to the data communication transmission mode of the port of the device so as to receive the signal transmitted by the device, and also can transmit the signal received from the main coil and/or the secondary coil to the device according to the data communication transmission mode matched with the port of the device. In the specific environments, such as under water and sand, signal transmission between the socket and the plug of the contactless connector of the present invention is realized through electromagnetic coupling between the secondary coil and the main coil, and it is unnecessary to depend on physical contact in signal transmission between the socket and the plug, so the influence on the signal transmission by the plugging and unplugging action between the socket and the plug is avoided; meanwhile, the signal processing circuit of the present application can adapt to the data communication transmission modes of different ports of the device during contactless signal transmission between the plug and the socket. Furthermore, the length of the cable may be adjusted according to the actual application scenario; therefore, the signal processing circuit of the embodiment enables the contactless connector to realize remote wireless signal transmission.

2. According to the contactless connector, on one hand, the data transmission mode of the plug may be configured as the data communication transmission mode of the port of the device connected to the plug and configure the data transmission mode of the socket as the data communication transmission mode of the port of the device connected to the socket; on the other hand, the first coil and the second coil are respectively arranged in the first threaded shell and the second threaded shell, so that the main coil and the secondary coil are in tight fit with each other and good electromagnetic coupling effect is achieved; and through the device side signal compensation factor and the coil side signal compensation factor, communication error code caused by a change of load and a change of transmission distance in the signal transmission process may be reduced, electromagnetic coupling interference caused by temperature, electrolyte resistivity or coil offset in the electromagnetic coupling process is reduced, and the accuracy of signal transmission is improved.

3. According to the signal processing method of the present application, the plug and the socket of the contactless connector can respectively configure protocols adapted to the ports of the devices according to the data communication transmission modes of the ports of the devices connected to the plug and the socket so as to receive the signals transmitted by the devices, and also can transmit the signal received from the main coil to the device according to the data communication transmission mode matched with the port of the device connected to the plug and the socket, and transmit the signal received from the secondary coil to the device according to the data communication transmission mode matched with the port of the device connected to the plug and the socket, thereby improving the applicability of the contactless connector.

Figure 1:
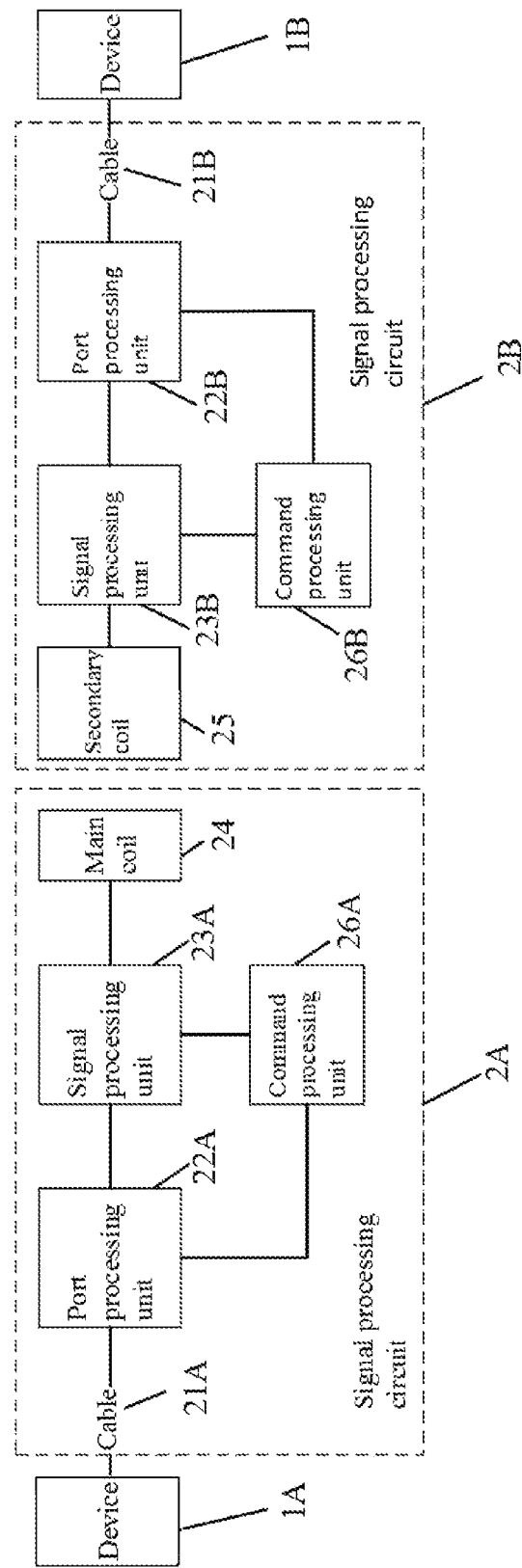
FIG. 1 shows a circuit schematic diagram of a signal processing circuit according to the present application.

REFERENCE NUMERALS 1A, 1B—device;
2A, 2B—signal processing circuit; 21A, 21B—cable; 22A, 22B—port processing unit, 221A, 221B—input/output processing module, 222A, 222B—signal processing module; 23A, 23B—signal processing unit, 231A, 231B—carrier compensation module, 232A, 232B—data modulation and demodulation module, 233A, 233B—data writing cache, 234A, 234B—data reading cache; 24—main coil, 25—secondary coil; 26A, 26B—command processing unit, 261A, 262B—command modulation and demodulation module, 262A, 262B—command reading cache, 263A, 263B—command writing cache; 27A, 27B—controller;
3—plug, 32—first electronic cabin, 33—first threaded shell, 34—first magnetic core, 35—first protective layer;
4—socket, 42—second electronic cabin, 43—second threaded shell, 44—second protective layer, 45—second magnetic core, 46—second threaded shell.

DESCRIPTION OF EMBODIMENTS

In order to make the objectives, technical solutions and advantages of the embodiments of the present invention clearer, the technical solutions in the embodiments of the present invention are described below clearly and completely with reference to the accompanying drawings in the embodiments of the present invention. Apparently, the described embodiments are some rather than all of the embodiments. All other embodiments obtained by those skilled in the art based on the embodiments of the present invention without creative efforts shall fall within the protection scope of the present invention.

Embodiment I

The embodiment of the present invention provides a signal processing circuit. The signal processing circuit is applied to a contactless connector. The contactless connector includes a plug and a socket. The plug includes a main coil. The socket includes a secondary coil. The plug and the socket are in communication connection respectively through electromagnetic coupling between the main coil and the secondary coil.

The signal processing circuit of the embodiment includes a cable, a port processing unit and a signal processing unit.

It should be noted that the signal processing circuit of the embodiment may be applied to the plug and/or the socket of the contactless connector. That is, the plug may be provided with the signal processing circuit, and the socket may also be provided with the signal processing circuit. For the convenience of description, the signal processing circuit in the plug is denoted as a signal processing circuit 2A, and the signal processing circuit in the socket is denoted as a signal processing circuit 2B.

Specifically, in the embodiment, as shown in FIG. 1, on one side of the plug, the signal processing circuit 2A includes a cable 21A, a port processing unit 22A and a signal processing unit 23A.

One end of the cable 21A can be connected to a device 1A through a port of the device 1A, and the other end of the cable 21A can be connected to the port processing unit 22A. The cable 21A is configured to receive a signal transmitted by the device 1A, and/or transmit a signal to the device 1A. One end of the port processing unit 22A is connected to the cable 21A and the other end of the port processing unit 22A is connected to the signal processing unit 23A. The port processing unit 22A is configured to acquire a data communication transmission mode of the port of the device connected to the plug and perform interface configuration on the cable 21A according to the data communication transmission mode.

Specifically, the cable 21A usually includes four leads. After the plug is connected to the port of the device 1A, the device 1A transmits information to the plug, and the signal processing circuit 2A may know the data communication transmission mode of the port of the device 1A. Here, the data communication transmission mode of the port may be transmission protocols such as URAT, IIC, SPI, CAN and the like. The port processing unit 22A may configure four leads of the cable 21A according to the data communication transmission mode of the port. For example, when the data communication transmission mode is URAT, three of the four leads are respectively configured as TX, RX and GND, and the remaining one lead is idle; when the data communication transmission mode is IIC, two of the four leads are respectively configured as SCL and SDA, and the remaining two leads are idle; when the data communication transmission mode is SPI, the four leads are respectively configured as CS, SCK, MISO and MOSI; and when the data communication transmission mode is CAN, three of the four leads are respectively configured as CAN H, CAN L and GND, and the remaining one lead is idle.

In this embodiment, the data communication transmission mode of the port is described by taking the URAT transmission protocol of TTL level as an example. That is, in this embodiment, three of the four leads of the cable 21A are respectively configured as TX, RX and GND, and the remaining one lead is idle.

The signal processing unit 2A is connected between the port processing unit 22A and the main coil 24. The signal processing unit 23A is configured to receive the signal transmitted by the device 1A and transmit the signal to the main coil 24. And/or, if the signal transmitted by the main coil 24 is received, the signal is transmitted to the port processing unit 22A, and the signal is transmitted to the device 1A by the port processing unit 22A according to the data communication transmission mode. Here, the signal transmitted by the main coil 24 is a signal which is transmitted by the secondary coil 25 of the socket and received by the main coil 24.

The signal processing circuit 2B on the socket includes a cable 21B, a port processing unit 22B and a signal processing unit 23B. As shown in FIG. 1, one end of the cable 21B can be connected to a device 1B and the other end of the cable 21B is connected to the port processing unit 22B. One end of the port processing unit 22B is connected to the cable 21B, and the other end of the port processing unit 22B is connected to the signal processing unit 23B. The signal processing unit 23B is connected to the secondary coil 25. Here, the specific functions of the cable 21B, the port processing unit 22B and the signal processing unit 23B and the signal processing unit are similar to those of the signal processing circuit 2A, which will not be elaborated herein.

That is, the signal processing circuit 2B on the socket may also configure the cable 21B according to the data communication transmission mode of the port of the device 1B, so that the socket may receive the signal transmitted by the device 1B.

According to the signal processing circuit 2A and the signal processing circuit 2B, the plug and the socket can respectively configure protocols adapted to the ports of the device 1A and the device 1B according to the data communication transmission modes of the ports of the device 1A and the device 1B so as to respectively receive the signals transmitted by the device 1A and the device 1B, and also can transmit the signal received from the main coil 24 to the device 1A according to the data communication transmission mode matched with the port of the device 1A and transmit the signal received from the secondary coil 25 to the device 1B according to the data communication transmission mode matched with the port of the device 1B.

In the specific environments, such as under water and sand, signal transmission between the socket and the plug is realized through electromagnetic coupling between the secondary coil 25 and the main coil 24, and it is unnecessary to depend on physical contact in signal transmission between the socket and the plug, so the influence on the signal transmission by the plugging and unplugging action between the socket and the plug is avoided. Meanwhile, the signal processing circuit of the embodiment can adapt to the data communication transmission modes of different ports of the device during contactless signal transmission between the plug and the socket. Furthermore, the length of the cable may be adjusted according to the actual application scenario; therefore, the signal processing circuit of the embodiment enables the contactless connector to realize remote wireless signal transmission.

In some preferred implementation manners of the embodiment, the port processing unit includes an input/output processing module and a signal processing module. The input/output processing module, one end of which is connected to the cable and the other end of which is connected to the signal processing module, is configured to calculate a device side signal compensation factor according to the received signal and an initial signal transmitted by the device.

The signal processing module, one end of which is connected to the input/output processing module and the other end of which is connected to the signal processing unit, is configured to receive the signal transmitted by the main coil and/or the secondary coil, convert the signal according to the data communication transmission mode and transmit the converted signal to the input/output processing module, so that the input/output processing module performs compensation processing on the converted signal according to the device side signal compensation factor and transmits the processed signal to the device.

Figure 5:
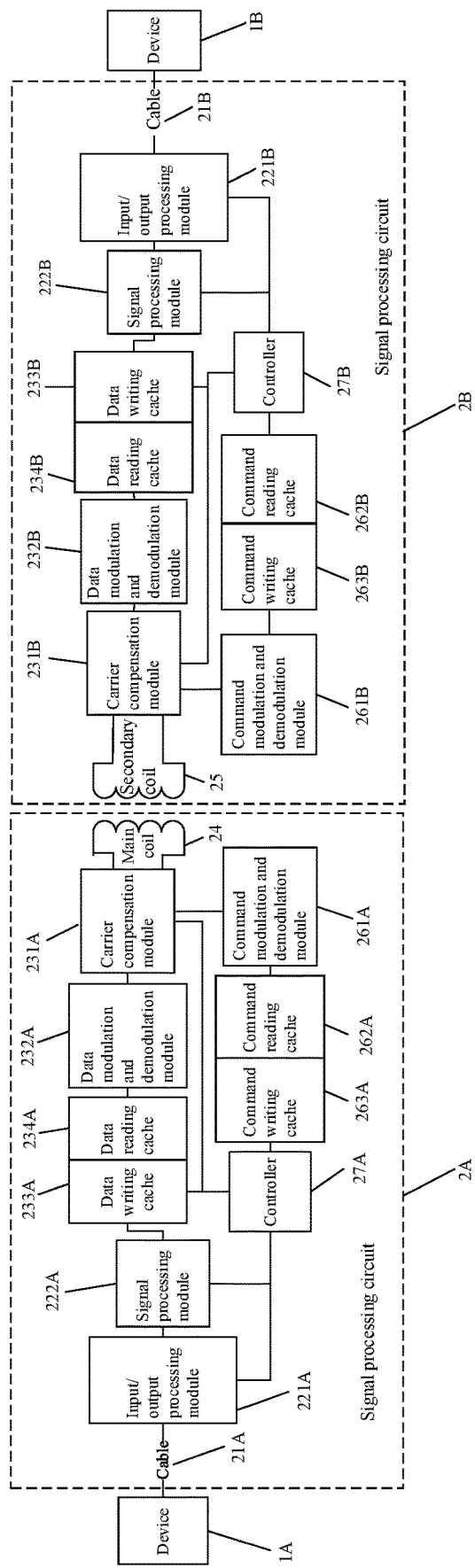
FIG. 5 shows a circuit schematic diagram of a signal processing circuit of a contactless connector according to the present application.

Specifically, referring to FIG. 5, for example, on one side of the plug, in the process that the device 1A transmits the signal to the port processing unit 22A through the cable 21A, there may be signal distortion caused by a change of load, a change of transmission distance and the like. To ensure the signal transmission accuracy, in the implementation manner, the signal processing module 222A may acquire a signal received in real time and an initial signal transmitted by the device 1A and matched with the signal received in real time, and then a device side signal compensation factor Ag' is calculated according to the two signals. The device side signal compensation factor Ag' herein may be a proportional relationship and may also be a factor obtained by other calculation forms, which is not limited by this embodiment.

After the device side signal compensation factor Ag' is obtained and when the signal to be transmitted to the device 1A by the main coil 24 is received, the signal may be converted into a data communication transmission mode matched with the port of the device 1A, and then the converted signal is transmitted to the input/output processing module 221A.

The input/output processing module 221A performs compensation processing on the converted signal according to the obtained device side signal compensation factor Ag' and transmits the signal subjected to compensation processing to the device 1A, thereby ensuring the accuracy of the signal received by the device 1A.

Here, the input/output processing module 221A may also filter and shape the signal received by the device 1A, thereby improving the signal reliability.

It should be noted that on one side of the socket, the port processing unit 22B may further include a signal processing module 222B. The device side signal compensation factor in the port processing unit 22B may be denoted as Bg', and the specific function of the device side signal compensation factor is similar to that in the port processing unit 22A, which is not elaborated herein.

In addition, the device side signal compensation factor Ag' in the signal processing circuit 2A and the device side signal compensation factor Bg' in the signal processing circuit 2B are factors calculated in real time. Signal reception and transmission are performed dynamically; therefore, calculating the compensation factor in real time and compensating and gaining the signal during signal transmission at the next moment may dynamically compensate signal distortion and improve the accuracy of signal transmission.

In some preferred implementation manners of the embodiment, the signal processing unit includes a carrier compensation module. Here, the signal processing unit 23A in the plug includes a carrier compensation module 231A, and the signal processing unit 23B in the socket includes a carrier compensation module 231B.

The carrier compensation module 231A is configured to calculate a main coil side signal compensation factor according to the acquired signal transmitted by the main coil 24 and a first preset signal, perform compensation processing on the signal transmitted by the device 1A according to the main coil side signal compensation factor and transmit the processed signal to the main coil.

The carrier compensation module 231A may generally include, but is not limited to, a gain compensation circuit, a power compensation circuit, a frequency compensation circuit and the like.

Specifically, during actual application of the contactless connector, when a signal is transmitted between the plug and the socket through electromagnetic coupling of the main coil 24 and the secondary coil 25, electromagnetic coupling is interfered due to the influence of external environment parameters (such as temperature), electrolyte resistivity or coil offset, resulting distortion of the signal received by the main coil 24.

In the implementation manner, the carrier compensation module 231A may acquire the signal transmitted by the main coil 24 and a first preset signal in real time. Here, the signal transmitted by the main coil 24 refers to a signal transmitted to the carrier compensation module 231A by the main coil 24, and may also be understood as a signal which is transmitted to the carrier compensation module 231A by the main coil 24 after the main coil 24 receives the signal transmitted by the secondary coil 25. The first preset signal may be, for example, a signal which is tested under a non-interference environment, received by the main coil 24 and transmitted by the secondary coil 25.

Then, the carrier compensation module 231A may calculate a main coil side signal compensation factor Ag by combining the acquired signal transmitted to the carrier compensation module 213A by the main coil 24 and the first preset signal. For example, when the carrier compensation factor 231A is a gain/power compensation circuit, a value which is obtained by dividing the first preset signal (a level/power value) by the signal (a level value/power) transmitted to the carrier compensation module 231A by the main coil 24 is denoted as a main coil side signal compensation factor Ag. For another example, when the carrier compensation factor 231A is a frequency compensation circuit, a difference value which is obtained by subtracting the first preset signal (carrier frequency) by the signal (carrier frequency) transmitted to the carrier compensation module 231A by the main coil 24 is denoted as a main coil side signal compensation factor Ag.

If the device 1A transmits data to the device 1B, the device 1A needs to transmit the signal to the main coil 24—secondary coil 25—device 1B. To ensure that an amplitude value of the signal received by the secondary coil 25 and the carrier frequency reach a threshold value capable of correctly demodulating a digital signal, that is, to compensate distortion caused by an interference factor and the like in the process of transmitting the signal to the secondary coil 25 by the main coil 24, the carrier compensation module 231A may compensate the signal transmitted by the device 1A with the main coil side signal compensation factor being Ag and then transmit the signal subjected to compensation processing to the main coil 24, and the signal is transmitted to the secondary coil 25 by the main coil 24, thereby improving the accuracy of the signal received by the secondary coil 25 and further ensuring the accuracy of the signal received by the device 1B.

Since the device 1B may transmit data to the device 1A, similarly, to ensure the accuracy of signal transmission and improve the reliability of signal transmission by the contactless connector, in the implementation manner, the carrier compensation module 231B is configured to calculate a secondary coil side signal compensation factor Bg according to the acquired signal transmitted by the secondary coil 25 and a second preset signal, perform compensation processing on the signal transmitted by the device 1B according to the secondary coil side signal compensation factor Bg and transmit the processed signal to the secondary coil 25.

Here, the principle of the second preset signal is as same as that of the first preset signal, and the principle and the signal processing process of the carrier compensation module 231B are similar to those of the carrier compensation module 231A, which are not elaborated herein.

It should be noted here that the main coil side signal compensation factor Ag in the signal processing circuit 2A and the secondary coil side signal compensation factor Bg in the signal processing circuit 2B are factors calculated in real time. Signal reception and transmission are performed dynamically; therefore, calculating the compensation factor in real time and compensating and gaining the signal during signal transmission at the next moment may dynamically compensate signal distortion and improve the accuracy of signal transmission.

By the implementation manner, the carrier compensation module 231A and the carrier compensation module 231B may respectively perform carrier compensation on the signal transmitted by the main coil 24 and the signal transmitted by the secondary coil 25, thereby avoiding the influence on signal transmission by the interference factor and improving the accuracy of signal transmission.

In some optional implementation manners of the embodiment, the plug and/or the socket further includes a command processing unit; the command processing unit is connected to the signal processing unit; the command processing unit is configured to determine whether there is a space capable of storing a signal in the socket, and if not, to control the plug to stop transmitting the signal to the socket; and/or the command processing unit is configured to determine whether there is a space capable of storing a signal in the socket, and if not, to control the socket to stop transmitting the signal to the plug.

Specifically, as shown in FIG. 1, the plug may be provided with a command processing unit 26A, and the socket may be provided with a command processing unit 26B. The command processing unit 26B in the socket may determine whether there is a storage space capable of storing a signal in the socket and transmit the determination result to the command processing unit 26A. The command processing unit 26A knows that if the socket is full, that is, there is no storage space for storing the signal in the socket and controls the plug to stop transmitting the signal to the socket. Similarly, the command processing unit 26A in the plug may determine whether there is a storage space capable of storing a signal in the plug and transmit the determination result to the command processing unit 26B. The command processing unit 26B knows that if the plug is full, that is, there is no storage space for storing the signal in the plug and controls the socket to stop transmitting the signal to the plug. In this way, signal storage in the plug and the socket of the contactless connector may be determined in time to stop transmitting the signal when the storage of the other party is full, thereby avoiding the situation that the signal cannot be received after being transmitted and avoiding invalid data transmission.

Preferably, the command processing unit 26A in the plug may also determine whether a signal in the plug is transmitted to the socket, and if not, transmit first prompt information representing that there is no signal to be transmitted. That is, since when the device 1A transmits a signal to the device 1B, the signal may be stored in a storage unit in the plug first, the command processing unit 26A in the plug may determine whether there is another signal transmitted to the socket according to whether the storage unit in the plug is empty. If the storage unit is empty, which means that there is no signal continuously transmitted, the command processing unit 26A may generate first prompt information representing that there is no signal to be transmitted and transmit the first prompt information to the device 1A and/or the device 1B, so that the device 1A and/or the device 1B knows that the signal transmission has been completed.

The command processing unit 26B in the socket may also determine whether a signal in the socket is transmitted to the plug, and if not, transmit second prompt information representing that there is no signal to be transmitted. That is, since when the device 1B transmits a signal to the device 1A, the signal may be stored in a storage unit in the socket first, the command processing unit 26B in the socket may determine whether there is another signal transmitted to the plug according to whether the storage unit in the socket is empty. If the storage unit is empty, which means that there is no signal continuously transmitted, the command processing unit 26B may generate second prompt information representing that there is no signal to be transmitted and transmit the second prompt information to the device 1B and/or the device 1A, so that the device 1B and/or the device 1A knows that the signal transmission has been completed.

By the implementation manner, the command processing unit 26A and the command processing unit 26B may respectively monitor signal reception and transmission of the device 1A and the device 1B and generate prompt information when no signal needs to be transmitted, so that it is convenient for the device 1A and the device 1B to acquire information that signal transmission has been completed, and invalid waiting of processors of the device 1A and the device 1B is avoided.

Embodiment II

Figure 2:
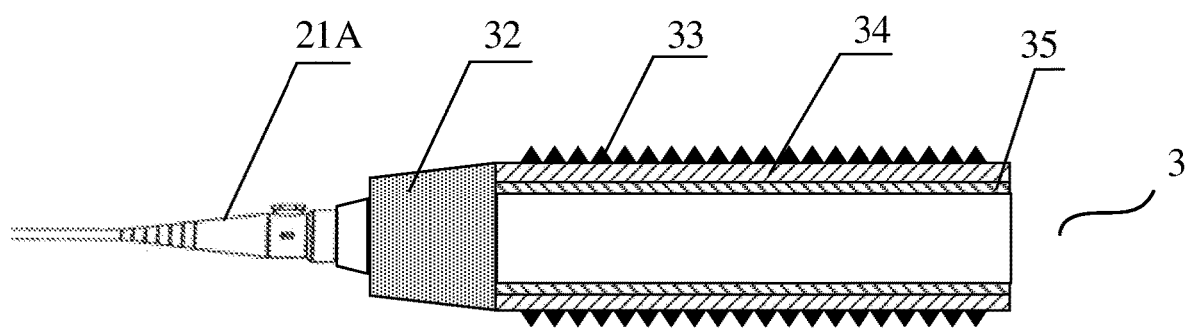
FIG. 2 shows a schematic diagram of a plug of a contactless connector according to the present application.
Figure 3:
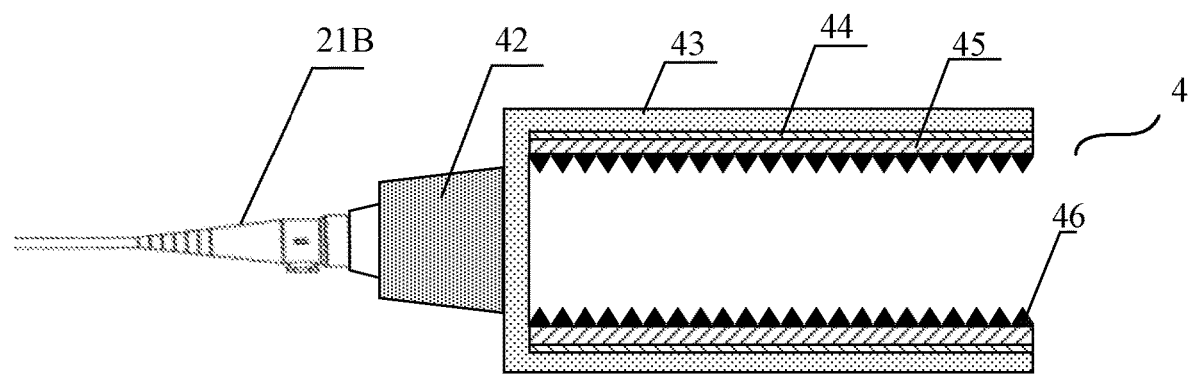
FIG. 3 shows a schematic diagram of a socket of a contactless connector according to the present application.

The embodiment of the present invention provides a contactless connector. As shown in FIG. 2 and FIG. 3, the contactless connector includes a plug 3 and a socket 4. The plug 3 includes a first magnetic core 34, a first threaded shell 33 and a first coil (not shown in the figure).

The first threaded shell 33 is configured to wrap a periphery of the first magnetic core 34. An inner wall of the first threaded shell 33 and the periphery of the first magnetic core 34 form a toothed cabin. The first coil is arranged in the toothed cabin of the first threaded shell 33. The first coil and the first magnetic core 34 form a main coil 24.

The socket 4 includes a second magnetic core 45, and a section of the second magnetic core 45 is ring-shaped. The second threaded shell 46 is arranged at an inner periphery of the second magnetic core 45, and an inner wall of the second threaded shell 46 and the inner periphery of the second magnetic core 45 form a toothed cabin. The second coil (not shown in the figure) is arranged in the toothed cabin of the second threaded shell 46. The second coil and the second magnetic core 45 form a secondary coil 25.

Preferably, as shown in FIG. 2, the plug 3 includes a cable 21A, a first electronic cabin 32, a first threaded shell 33, a first magnetic core 34 and a first protective layer 35.

The cable 21A has four leads, and the cable 21A is connected to the first electronic cabin 32. In combination with the embodiment I, it can be seen that an interface mode which may be configured by the cable 21A includes, but is not limited to: URAT (RS485), IIC, SPI and CAN. A circuit board is mounted in the first electronic cabin 32. The cable 21A and the first electronic cabin 32 have insulating, waterproof and corrosion-resistant properties. The first threaded shell 33 is a thin-layer shell wrapping an insulating and wear-resistant material, and an inner wall of the first threaded shell 33 and the periphery of the first magnetic core 34 form a toothed cabin for a litz wire to pass through. The first magnetic core 34 may be ferrite, and a cross section of the first magnetic core 34 is generally ring-shaped. The litz wire passes through the toothed cabin of the first threaded shell 33 of the plug and goes around the first magnetic core 34 to form a coil, that is, a first coil. The first protective layer 35 is a plastic hard shell closely attached to the first magnetic core 34 and plays a role in protecting and fixing the first magnetic core 34. The first coil and the first magnetic core 34 form a main coil 24. The main coil 24 may be a ferrite coil.

as shown in FIG. 3, the socket 4 includes a cable 21B, second electronic cabin 42, a shell 43, a second protective layer 44, a second magnetic core 45 and a second threaded shell 46.

The cable 21B has four leads, and the cable 21B is connected to the second electronic cabin 42. In combination with the embodiment I, it can be seen that an interface mode which may be configured by the cable 21B includes, but is not limited to: URAT (RS485), IIC, SPI and CAN. A circuit board is mounted in the second electronic cabin 42. The cable 21B and the second electronic cabin 42 have insulating, waterproof and corrosion-resistant properties. The second threaded shell 46 is a thin-layer shell wrapping an insulating and wear-resistant material, and an inner wall of the second threaded shell 46 and the inner periphery of the second magnetic core 45 form a toothed cabin for a litz wire to pass through. The second magnetic core 45 may be ferrite, and a cross section of the second magnetic core 45 is generally ring-shaped. The litz wire passes through the toothed cabin of the second threaded shell 46 of the plug 4 and goes around the second magnetic core 45 to form a coil, that is, a second coil. The second protective layer 44 is a plastic hard shell closely attached to the second magnetic core 45 and plays a role in protecting and fixing the second magnetic core 45. The second coil and the second magnetic core 45 form a secondary coil 25.

Figure 4:
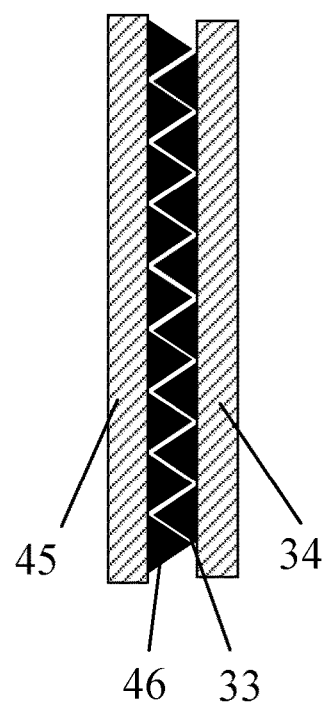
FIG. 4 shows a schematic diagram of a connection part of a plug and a socket of a contactless connector according to the present application.

The second threaded shell 46 may be understood as internal thread, and the first threaded shell 33 may be understood as external thread, so that when the plug 3 is screwed into the socket 4, as shown in FIG. 4, threaded connection may be realized through the first threaded shell 33 and the second threaded shell 46. Furthermore, the first coil is arranged on the toothed cabin of the first threaded shell 33 and the second coil is arranged on the toothed cabin of the second threaded shell 46, so that the main coil 24 and the secondary coil 25 are connected more closely when the plug 3 and the socket 4 are connected through the first threaded shell 33 and the second threaded shell 46, thus greatly improving the electromagnetic coupling capability between the main coil and the secondary coil and the anti-interference capability during signal transmission.

Optionally, the contactless connector of the embodiment further includes the signal processing circuit in the embodiment I. As shown in FIG. 5, the signal processing circuit of the embodiment specially may include:

the signal processing circuit 2A in the plug 3 specifically includes a cable 21A, an input/output processing module 221A, a signal processing module 222A, a controller 27A, a data writing cache 233A, a data reading cache 234A, a data modulation and demodulation module 232A, a carrier compensation module 231A, a command writing cache 263A, a command reading cache 262A and a command modulation and demodulation module 261A. The carrier compensation module 231A is connected to the main coil 24. The connection relationship of various modules is shown in FIG. 5.

Here, the controller 27A may control a port processing unit 22A, a signal processing unit 23A and a command processing unit 26A. Specifically, the port processing unit 22A includes a signal processing module 222A and an input/output processing module 221A, and the signal processing module 222A is, for example, FPGA. The signal processing unit 23A may include a carrier compensation module 231A and may further include a data modulation and demodulation module 232A, a data writing cache 233A and a data reading cache 234A. The command processing unit 26A may include a command modulation and demodulation module 261A, a command reading cache 262A and a command writing cache 263A.

For the signal processing circuit 2B in the socket 4, the specific circuit module and connection relationship which the signal processing circuit 2B specifically includes as well as functions of various modules may be referenced to the signal processing circuit 2A, which are not elaborated herein.

For the convenience of understanding, in this embodiment, the following is described directly with reference to modules in FIG. 5.

Figure 6:
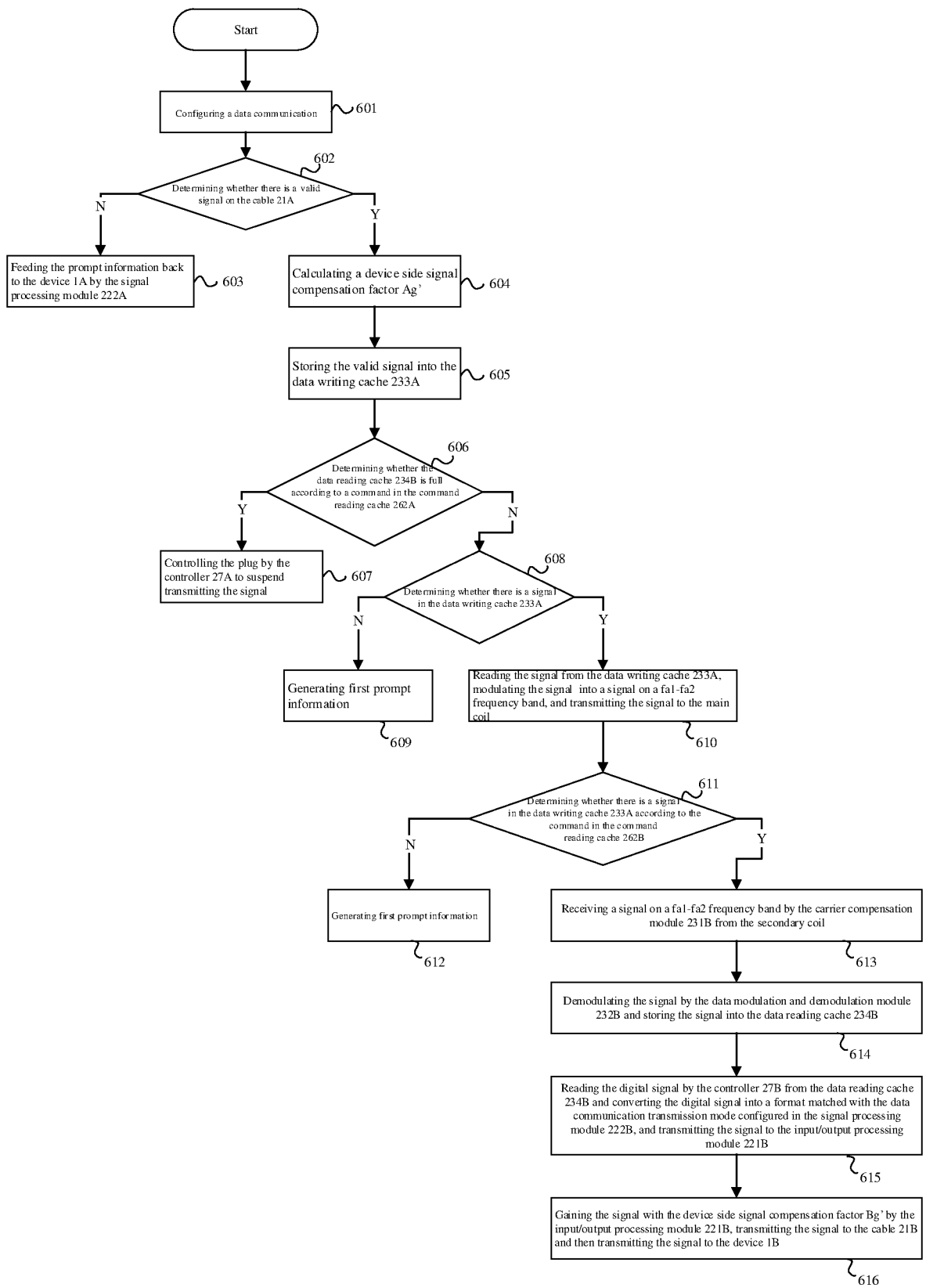
FIG. 6 shows a signal transmission flowchart of a contactless connector according to the present application.

When the signal is transmitted from the device 1A to the device 1B, in combination with the circuit diagram in FIG. 5, the signal processing process is shown in FIG. 6:

Step 601: a data communication transmission mode is configured.

When the plug 3 of the contactless connector is connected to the device 1A, the controller 27A may configure the cable 21A as a data communication transmission mode matched with a port of the device 1A. The specific configuration mode is similar to a mode that in the embodiment I, which is not elaborated herein.

when the socket 4 of the contactless connector is connected to the device 1B, the controller 27B may configure the cable 21B as a data communication transmission mode matched with a port of the device 1B. The specific configuration mode is similar to a mode that in the embodiment I, which is not elaborated herein.

step 602: whether there is a valid signal on the cable 21A is determined.

Step 603: if there is no valid signal, the prompt information is fed back to the device 1A by the signal processing module 222A.

Specifically, the signal processing module 222A may be FPGA.

Step 604: if there is a valid signal, a device side signal compensation factor Ag' is calculated.

Specifically, the input/output processing module 221A calculates the device side signal compensation factor Ag' according to the signal received by the cable 21A and the initial signal transmitted by the device 1A and transmits the Ag' to the controller 27A for storage.

Step 605: if there is a valid signal, the signal is stored into the data writing cache 233A.

Specifically, FPGA stores the signal into the data writing cache 233A.

Step 606: according to a command in the command reading cache 262A, whether the data reading cache 234B is full is determined.

Specifically, the data reading cache 234B in the signal processing circuit 2B is configured to store the signal received by the secondary coil 25, and the data writing cache 233B in the signal processing circuit 2B is configured to store the signal which is transmitted to the socket 4 by the device 1B. The controller 27B generates a command according to an empty/full state of signals stored in the data reading cache 234B and the data writing cache 233B. Then, the controller 27B stores the command into the command writing cache 263B; the command modulation and demodulation module 261B reads the command from the command writing cache 263B, modulates the command into a signal on a fb3-fb4 frequency band and transmits the signal to the carrier compensation module 231B; and the carrier compensation module 231B transmits the signal to the main coil 24 after gaining the signal with the secondary coil side signal compensation factor Bg.

The carrier compensation module 231A may receive the signal (indicating command) on the fb3-fb4 frequency band from the main coil 24, filter the signal and transmit the signal to the command modulation and demodulation module 261A. The command modulation and demodulation module 261A demodulates the signal on the fb3-fb4 frequency band to acquire a digital signal and then transmits the digital signal to the command reading cache 262A for storage. When transmitting the signal to the main coil 24, the controller 27A may read the command from the command reading cache 262A to acquire the empty/full state of the signal of the data reading cache 234B in the current signal processing circuit 2B.

Step 607: if full, the controller 27A controls the plug 3 to suspend transmitting the signal.

Step 608: if not full, whether there is a signal in the data writing cache 233A is determined.

Specifically, the controller 27A may determine whether there is a signal in the data writing cache 233A according to the storage situation of the data writing cache 233A.

Step 609: if there is no signal, first prompt information may be generated.

Specifically, the controller 27A may generate first prompt information and transmit the first prompt information to the device 1A.

Step 610: if there is a signal, the signal is read from the data writing cache 233A and is modulated into a signal on a fa1-fa2 frequency band, and the signal is transmitted to the main coil 24.

Specifically, if there is a signal in the data writing cache 233A, the data modulation and demodulation module 232A may read the signal from the data writing cache 233A and perform carrier modulation on the signal to acquire a signal on a fa1-fa2 frequency band, and then the signal is subjected to Ag-fold gain amplification by the carrier compensation module 231A and is transmitted to the main coil 24.

Step 611: according to a command in the command reading cache 262B, whether there is a signal in the data writing cache 233A is determined.

Specifically, the data reading cache 234A in the signal processing circuit 2A is configured to store the signal received by the main coil 24, and the data writing cache 233A in the signal processing circuit 2A is configured to store the signal which is transmitted to the plug 3 by the device 1A. The controller 27A generates a command according to an empty/full state of signals stored in the data reading cache 234A and the data writing cache 233A. Then, the controller 27A stores the command into the command writing cache 263A; the command modulation and demodulation module 261A reads the command from the command writing cache 263A, modulates the command into a signal on a fa3-fa4 frequency band and transmits the signal to the carrier compensation module 231A; and after the carrier compensation module 231A gains the signal with the secondary coil side signal compensation factor Ag, the signal is transmitted to the secondary coil 25 by the main coil 24.

The carrier compensation module 231B may receive the signal (indicating command) on the fa3-fa4 frequency band from the secondary coil 25, filter the signal and transmit the signal to the command modulation and demodulation module 262B. The command modulation and demodulation module 262B demodulates the signal on the fa3-fa4 frequency band to acquire a digital signal and then transmits the digital signal to the command reading cache 262B for storage.

When the signal processing circuit 2B receives the signal transmitted by the signal processing circuit 2A, the controller 27B may determine whether the data writing cache 233A in the signal processing circuit 2A is empty, that is, whether there is a signal according to the command in the command reading cache 262B.

Step 612: if there is no signal in the data writing cache 233A, first prompt information may be generated.

Specifically, first prompt information may be generated for the controller 27B. The first prompt information may be transmitted to the device 1B.

Step 613: if there is a signal in the data writing cache 233A, the carrier compensation module 231B receives a signal on a fa1-fa2 frequency band from the secondary coil 25.

Step 614: the data modulation and demodulation module 232B demodulates the signal and stores the signal into the data reading cache 234B.

Specifically, the data modulation and demodulation module 232B demodulates the signal on the fa1-fa2 frequency band into a digital signal to be stored in the data reading cache 234B.

Step 615: the controller 27B reads the digital signal from the data reading cache 234B, converts the digital signal into a format matched with the data communication transmission mode configured in the signal processing module 222B and transmits the signal to the input/output processing module 221B.

Step 616: the input/output processing module 221B gains the signal with the device side signal compensation factor Bg', transmits the signal to the cable 21B and then transmits the signal to the device 1B.

Specifically, the device side signal compensation factor Bg' may be calculated by a mode similar to that of the device side signal compensation factor Ag' in the embodiment I, except that data based on which Bg' is calculated is the signal received by the input/output processing module in real time and the initial signal transmitted by the device 1B.

It should be noted that to ensure normal reception and transmission of the signal and the command between the main coil and the secondary coil, in the embodiment, the signal which is transmitted to the secondary coil 25 by the main coil 24 is modulated into the fa3-fa4 frequency band, the signal transmitted to the main coil 24 by the secondary coil 25 is modulated into the fb1-fb2 frequency band, and the command transmitted to the main coil 24 by the secondary coil 25 is modulated into the fb3-fb4 frequency band.

The above process is a signal transmission process of transmitting the signal to the device 1B by the device 1A in the embodiment. The signal transmission process of transmitting the signal to the device 1A by the device 1B is similar to the above process, which is not elaborated herein.

According to the contactless connector of the embodiment, on one hand, the data transmission mode of the plug 3 may be configured as a data communication transmission mode of the port of the device 1A connected to the plug 3, and the data transmission mode of the socket 4 is configured as a data communication transmission mode of the port of the device 1B connected to the socket 4; on the other hand, the first coil and the second coil are respectively arranged in the first threaded shell 33 and the second threaded shell 46, so that the main coil is in tight fit with the secondary coil when the plug 3 is connected to the socket 4, and good electromagnetic coupling effect is achieved; and through the device side signal compensation factor and the coil side signal compensation factor, communication error code caused by a change of load and a change of transmission distance in the signal transmission process may be reduced, electromagnetic coupling interference caused by temperature, electrolyte resistivity or coil offset in the electromagnetic coupling process is reduced, and the accuracy of signal transmission is improved.

Embodiment III

The embodiment of the present invention provides a signal processing method. The signal processing method may be applied to the signal processing circuit in the embodiment I, of course, may also be applied to the contactless connector in the embodiment II, and may be applied to other circuits or devices capable of implementing the method, which are not limited by this embodiment.

Figure 7:
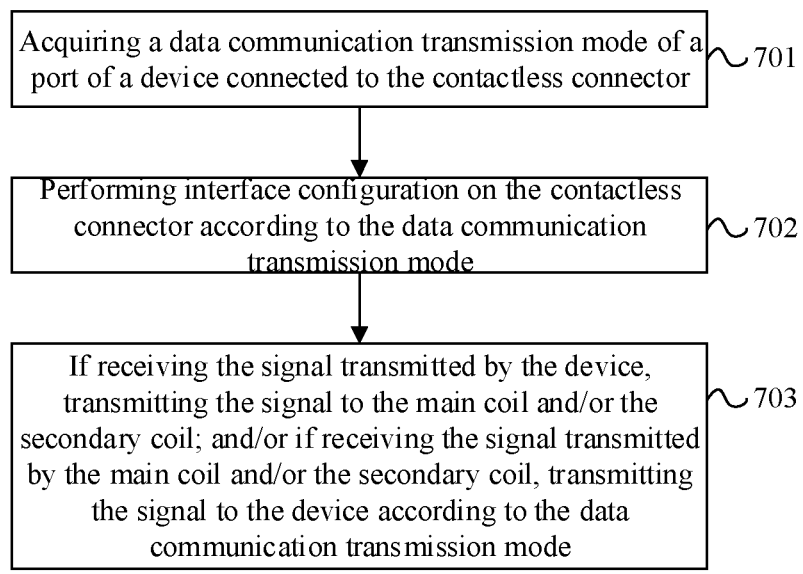
FIG. 7 shows a flowchart of a signal processing method according to the present application.

As shown in FIG. 7, the signal processing method includes:

step 701: a data communication transmission mode of a port of a device connected to the contactless connector is acquired.

The specific implementation manner may be performed by a manner similar to that in the embodiment I, which is not elaborated herein.

Step 702: the contactless connector is subjected to interface configuration according to the data communication transmission mode.

The specific implementation manner may be performed by a mode similar to that in the embodiment I, which is not elaborated herein.

Step 703: if a signal transmitted by the device is received, the signal is transmitted to the main coil and/or the secondary coil; and/or if a signal transmitted by the main coil and/or the secondary coil is received, the signal is transmitted to the device according to the data communication transmission mode.

The specific implementation manner may be performed by a manner similar to that in the embodiment I, which is not elaborated herein.

By the signal processing method of the embodiment, the plug and the socket of the contactless connector may respectively configure protocols adapted to the ports of the devices according to the data communication transmission modes of the ports of the devices connected to the plug and the socket, so as to receive the signals transmitted by the devices, and also can transmit the signal received from the main coil to the device according to the data communication transmission mode matched with the port of the device connected to the plug and the socket and transmit the signal received from the secondary coil to the device according to the data communication transmission mode matched with the port of the device connected to the plug and the socket, thereby improving the applicability of the contactless connector.

In some optional implementation manners in the embodiment, the signal processing method further includes: a device side signal compensation factor is calculated according to the received signal and an initial signal transmitted by the device. The specific calculation manner may be similar to a manner similar to that in the embodiment I, which is not elaborated herein.

In the above step 703, the receiving the signal transmitted by the main coil and/or the secondary coil and transmitting the signal to the device according to the data communication transmission mode includes: the signal transmitted by the main coil and/or the secondary coil is received and is converted according to the data communication transmission mode; and the converted signal is subjected to compensation processing according to the device side signal compensation factor and the processed signal is transmitted to the device. The specific implementation manner may be performed by a manner similar to that in the embodiment I, which is not elaborated herein.

In some optional implementation manners of the embodiment, the signal processing method further includes: a main coil side signal compensation factor is calculated according to the acquired signal transmitted by the main coil and a first preset signal.

The specific calculation mode may be implemented by a mode similar to that in the embodiment I, which is not elaborated herein.

In the above step 703, the receiving the signal transmitted by the device and transmitting the signal to the main coil specifically includes: the signal transmitted by the device is subjected to compensation processing according to the main coil side signal compensation factor; and the processed signal is transmitted to the main coil. The specific calculation mode may be performed by a mode similar to that in the embodiment 1, which is not elaborated herein.

In some optional implementation manners of the embodiment, the signal processing method further includes: a secondary coil side signal compensation factor is calculated according to the acquired signal transmitted by the secondary coil and a second preset signal. The specific calculation mode may be performed by a mode similar to that in the embodiment 1, which is not elaborated herein.

In the step 703, the receiving the signal transmitted by the device and transmitting the signal to the secondary coil specifically includes: the signal transmitted by the device is subjected to compensation processing according to the secondary coil side signal compensation factor; and the processed signal is transmitted to the secondary coil. The specific implementation manner may be performed by a manner similar to that in the embodiment I, which is not elaborated herein.

Figure 8:
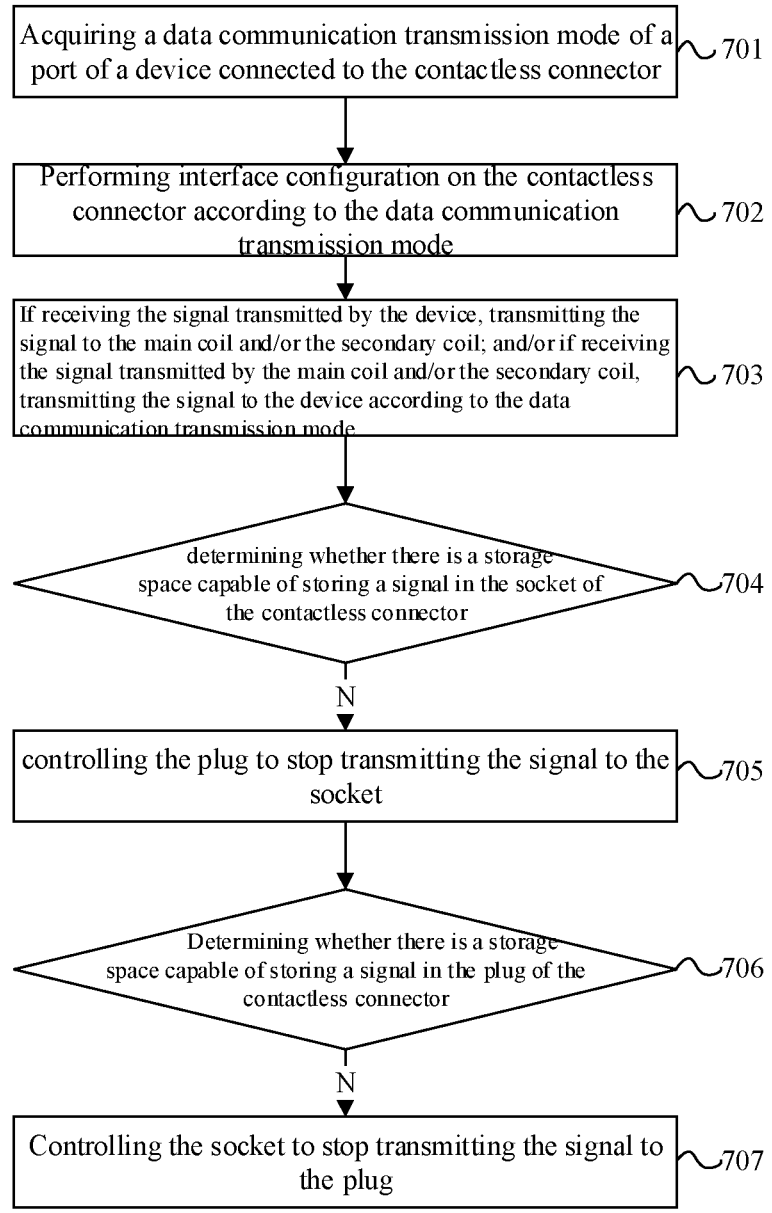
FIG. 8 shows another flowchart of a signal processing method according to the present application.

In some optional implementation manners of the embodiment, as shown in FIG. 8, the signal processing method further includes:

step 704: whether there is a storage space capable of storing a signal in the socket of the contactless connector is determined.

Step 705: if not, the plug is controlled to stop transmitting the signal to the socket.

Step 706: whether there is a storage space capable of storing a signal in the plug of the contactless connector is determined.

Step 707: if not, the socket is controlled to stop transmitting the signal to the plug.

The above steps 704-707 may be respectively performed by a mode similar to that in the embodiment I, which is not elaborated herein.

Figure 9:
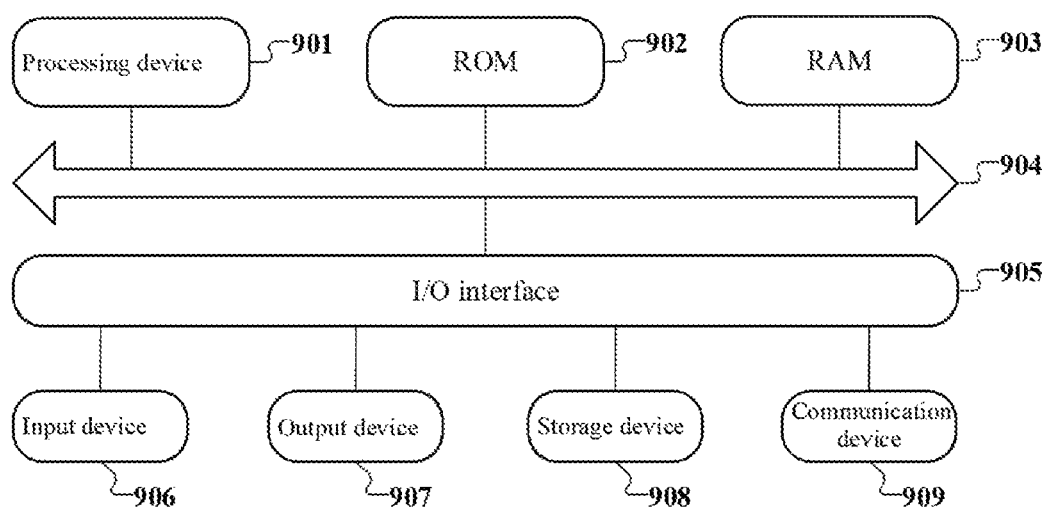
FIG. 9 is a schematic structural diagram suitable for implementing a controller according to an embodiment of the present invention.

Referring to FIG. 9, it shows a structural schematic diagram of a controller suitable for implementing the embodiment of the present application. The controller here may be, for example, a controller 27A in the above embodiments, and may further be a controller 27B in the above embodiments. The controller as shown in FIG. 9 is only an example and should not bring any limitation to the functions and application scope of the embodiment of the present application.

As shown in FIG. 9, the controller may include a processing device (such as a central processing unit, a graphics processing unit and the like) 901, and the processing device may perform various kinds of appropriate action and processing according to a program stored in a read-only memory (ROM) 902 or a program loaded to a random access memory (RAM) 903 from a storage device 908. Various programs and signals required for operation of a controller are stored in the RAM 903. The processing device 901, the ROM 902 and the RAM 903 are mutually connected through a bus 904. An input/output (I/O) interface 905 is also connected to the bus 904.

Generally, the following devices may be connected to the I/O interface 905: including an input device 906 such as a touch screen, a touch panel, a keyboard, a mouse, a camera, a microphone, an accelerometer, a gyroscope and the like; including an output device 907 such as a liquid crystal display (LCD), a loudspeaker, a vibrator and the like; including a storage device 908 such as a magnetic tape, a hard disk and the like; and a communication device 909. The communication device 909 may allow the controller and other devices to perform wireless or wired communication to switch the signal. FIG. 9 shows the controller with various devices, but it should be understood that it is unnecessary to implement or have all the shown devices. It may alternatively implement or have more or less devices. Each square frame shown in FIG. 9 may represent one device, and may also represent a plurality of devices according to requirements.

In particular, according to the embodiment of the present application, the process described above with reference to the flowchart may be implemented as a computer software program. For example, the embodiment of the present application includes a computer program product, including a computer program loaded on a computer readable medium. The computer program includes a program code for performing a method shown in the flowchart. In this embodiment, the computer program may be downloaded and installed from a network through the communication device 909, or be installed from the storage device 908, or be installed from the ROM 902. When the computer program is executed by the processing device 901, the above function limited in the method of the embodiment of the present application is performed.

It should be noted that the computer readable medium according to the embodiment of the present application may be a computer readable signal medium or a computer readable storage medium or any combination of the two. For example, the computer readable storage medium, may be, but not limited to, electric, magnetic, optical, electromagnetic, infrared or semiconductor system, device or apparatus, or combination of the above. A more specific example of the computer readable storage medium may include, but is not limited to, electric connection with one or more leads, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device or any appropriate combination of the above.

In the embodiment of the present application, a computer readable storage medium may be any tangible medium including or storing a program, and the program may be used by or in combination with an instruction execution system, device or apparatus. However, in the embodiment of the present application, the computer readable signal medium may include a digital signal propagated in a base band or as a part of carrier wave, and a computer readable program code is carried in the computer readable signal medium. The propagated digital signal may adopt various forms, including but not limited to an electromagnetic signal, an optical signal or any appropriate combination of the above. The computer readable signal medium may further be any computer readable medium other than the computer readable storage medium. The computer readable signal medium may send, propagate or transmit the program which is used by or in combination with the instruction execution system, device or apparatus. The program code included in the computer readable medium may be transmitted by any appropriate medium, including but not limited to: an electric wire, an optical cable, radio frequency (RF) and the like, or any appropriate combination of the above.

The above computer readable medium may be included in the above controller, and may also be present singly and is not assembled in a server. The computer readable medium carries one or more programs. When one or more programs are executed by the controller, the controller: acquires a data communication transmission mode of a port of a device connected to the contactless connector; performs interface configuration on the contactless connector according to the data communication transmission mode; transmits the signal to the main coil and/or the secondary coil if receiving the signal transmitted by the device; and/or transmits the signal to the device according to the data communication transmission mode if receiving the signal transmitted by the main coil and/or the secondary coil.

A computer program code for performing operation of the embodiment of the present application may be written by one or more program design languages or their combination. The program design language includes an object-oriented program design language, such as Java, Smalltalk and C++, and further includes a conventional procedural program design language, such as "C" language or similar program design language. The program code may be completely executed on a user computer, be partially executed on the user computer, be executed as an independent soft package, be executed partially on the user computer and partially on a remote computer, or be completely executed on the remote computer or a server. In the situation involving the remote computer, the remote computer may be connected to the user computer through any types of networks, including a local area network (LAN) or a wide area network (WAN), or may be connected to an external computer (for example, connected through the Internet by an Internet service provider).

The above description is only an explanation of preferred embodiments of the present application and the applied technical principles. It should be understood by those skilled in the art that the inventive scope of the embodiment of the present invention is not limited to the technical solutions formed by the particular combinations of the above-mentioned technical features and should also cover other technical solutions formed by any combinations of the above-mentioned technical features or equivalent features thereof without departing from the concept of the invention, for example, the technical solutions formed by interchanging the above-mentioned features with the technical features with similar functions disclosed (but not limited to) in the embodiment of the present application.

What is claimed is:

1. A signal processing circuit, applied to a contactless connector, the contactless connector comprising a plug and a socket, the plug comprising a main coil, the socket comprising a secondary coil, the plug and the socket being in communication connection respectively through electromagnetic coupling between the main coil and the secondary coil, and the signal processing circuit being arranged on the plug and/or the socket, wherein the signal processing circuit comprises a cable, a port processing unit and a signal processing unit;

the cable, one end of which can be connected to a device and the other end of which is connected to the port processing unit, is configured to receive a signal transmitted by the device and/or transmit a signal to the device;

the port processing unit, one end of which is connected to the cable and the other end of which is connected to the signal processing unit, is configured to acquire a data communication transmission mode of a port of the device connected to the connector and perform interface configuration on the cable according to the data communication transmission mode; and the signal processing unit, which is connected to the main coil and/or the secondary coil, is configured to, if receiving the signal transmitted by the device, transmit the signal to the main coil and/or the secondary coil, and/or is configured to, if receiving the signal transmitted by the main coil and/or the secondary coil, transmit the signal to the device according to the data communication transmission mode;

the port processing unit comprises an input/output processing module and a signal processing module;

the input/output processing module, one end of which is connected to the cable and the other end of which is connected to the signal processing module, is configured to calculate a device side signal compensation factor according to the received signal and an initial signal transmitted by the device; and the signal processing module, one end of which is connected to the input/output processing module and the other end of which is connected to the signal processing unit, is configured to receive the signal transmitted by the main coil and/or the secondary coil, convert the signal according to the data communication transmission mode and transmit the converted signal to the input/output processing module, so that the input/output processing module performs compensation processing on the converted signal according to the device side signal compensation factor and transmits the processed signal to the device.

2. The signal processing unit according to claim 1, wherein the signal processing unit comprises a carrier compensation module; one end of the carrier compensation module is connected to the port processing unit and the other end of the carrier compensation module is connected to the main coil and/or the secondary coil;

the carrier compensation module is configured to calculate a main coil side signal compensation factor according to the acquired signal transmitted by the main coil and a first preset signal, perform compensation processing on the signal transmitted by the device according to the main coil side signal compensation factor, and transmit the processed signal to the main coil; and/or the carrier compensation module is further configured to calculate a secondary coil side signal compensation factor according to the acquired signal transmitted by the secondary coil and a second preset signal, perform compensation processing on the signal transmitted by the device according to the secondary coil side signal compensation factor, and transmit the processed signal to the secondary coil.

3. The signal processing circuit according to claim 1, wherein the plug and/or the socket further comprises a command processing unit; the command processing unit is connected to the signal processing unit;

the command processing unit is configured to determine whether there is a space capable of storing a signal in the socket, and if not, to control the plug to stop transmitting the signal to the socket; and/or the command processing unit is configured to determine whether there is a space capable of storing a signal in the socket, and if not, to control the socket to stop transmitting the signal to the plug.

4. The signal processing circuit according to claim 2, wherein the plug and/or the socket further comprises a command processing unit; the command processing unit is connected to the signal processing unit;

the command processing unit is configured to determine whether there is a space capable of storing a signal in the socket, and if not, to control the plug to stop transmitting the signal to the socket; and/or the command processing unit is configured to determine whether there is a space capable of storing a signal in the socket, and if not, to control the socket to stop transmitting the signal to the plug.

5. The signal processing unit according to claim 3, wherein the command processing unit is further configured to:

determine whether a signal in the plug is transmitted to the socket, and if not, to transmit first prompt information representing that there is no signal to be transmitted; and/or determine whether a signal in the socket is transmitted to the plug, and if not, to transmit second prompt information representing that there is no signal to be transmitted.

6. A contactless connector, comprising a plug and a socket, wherein the plug comprises:

a first magnetic core;

a first threaded shell, configured to wrap a periphery of the first magnetic core, an inner wall of the first threaded shell and the periphery of the first magnetic core forming a toothed cabin;

a first coil, arranged on the toothed cabin of the first threaded shell, the first coil and the first magnetic core forming a main coil;

the socket comprises:

a second magnetic core;

a second threaded shell, arranged at an inner periphery of the second magnetic core, an inner wall of the second threaded shell and the inner periphery of the second magnetic core forming a toothed cabin, and the plug and the socket are in threaded connection through the first threaded shell and the second threaded shell;

a second coil, arranged on the toothed cabin of the second threaded shell, the second coil and the second magnetic core forming a secondary coil, and the main coil and the secondary coil are electromagnetically coupled to realize communication connection between the plug and the socket when the plug is connected to the socket; and the contactless connector further comprises the signal processing circuit according to any one of claim 1.

7. A signal processing method, applied to the contactless connector according to claim 6, comprising:

acquiring a data communication transmission mode of a port of a device connected to the contactless connector;

performing interface configuration on the contactless connector according to the data communication transmission mode;

if receiving a signal transmitted by the device, transmitting the signal to the main coil and/or the secondary coil; and/or if receiving a signal transmitted by the main coil and/or the secondary coil, transmitting the signal to the device according to the data communication transmission mode.

8. The signal processing method according to claim 7, further comprising:

calculating a device side signal compensation factor according to the received signal and an initial signal transmitted by the device; and the receiving the signal transmitted by the main coil and/or the secondary coil and transmitting the signal to the device according to the data communication transmission mode comprises:

receiving the signal transmitted by the main coil and/or the secondary coil and converting the signal according to the data communication transmission mode; and performing compensation processing on the converted signal according to the device side signal compensation factor and transmitting the processed signal to the device.

9. The signal processing method according to claim 7, further comprising:

calculating a main coil side signal compensation factor according to the acquired signal transmitted by the main coil and a first preset signal; and the receiving the signal transmitted by the device and transmitting the signal to the main coil specifically comprises:

performing compensation processing on the signal transmitted by the device according to the main coil side signal compensation factor and transmitting the processed signal to the main coil.

10. The signal processing method according to claim 7, further comprising:

calculating a secondary coil signal compensation factor according to the acquired signal transmitted by the secondary coil and a second preset signal; and the receiving the signal transmitted by the device and transmitting the signal to the secondary coil specifically comprises:

performing compensation processing on the signal transmitted by the device according to the secondary coil side signal compensation factor and transmitting the processed signal to the secondary coil.

11. The signal processing method according to claim 7, further comprising:

determining whether there is a space capable of storing a signal in the socket, and if not, controlling the plug to stop transmitting the signal to the socket; and/or determining whether there is a space capable of storing a signal in the plug, and if not, controlling the socket to stop transmitting the signal to the plug.

12. The signal processing method according to claim 7, further comprising:

determine whether a signal in the plug of the contactless connector is transmitted to the socket;

and if not, transmitting first prompt information representing that there is no signal to be transmitted; and/or determining a signal in the socket of the contactless connector is transmitted to the plug;

and if not, transmitting second prompt information representing that there is no signal to be transmitted.

13. The signal processing method according to claim 8, further comprising:

determine whether a signal in the plug of the contactless connector is transmitted to the socket;

and if not, transmitting first prompt information representing that there is no signal to be transmitted; and/or determining a signal in the socket of the contactless connector is transmitted to the plug;

and if not, transmitting second prompt information representing that there is no signal to be transmitted.

14. The signal processing method according to claim 9, further comprising:

determine whether a signal in the plug of the contactless connector is transmitted to the socket;

and if not, transmitting first prompt information representing that there is no signal to be transmitted; and/or determining a signal in the socket of the contactless connector is transmitted to the plug;

and if not, transmitting second prompt information representing that there is no signal to be transmitted.

15. The signal processing method according to claim 10, further comprising:

determine whether a signal in the plug of the contactless connector is transmitted to the socket;

and if not, transmitting first prompt information representing that there is no signal to be transmitted; and/or determining a signal in the socket of the contactless connector is transmitted to the plug;

and if not, transmitting second prompt information representing that there is no signal to be transmitted.

16. The signal processing method according to claim 11, further comprising:

determine whether a signal in the plug of the contactless connector is transmitted to the socket;

and if not, transmitting first prompt information representing that there is no signal to be transmitted; and/or determining a signal in the socket of the contactless connector is transmitted to the plug;

and if not, transmitting second prompt information representing that there is no signal to be transmitted.

* * * * *